(12) United States Patent
Hung

(10) Patent No.: US 7,883,308 B2
(45) Date of Patent: Feb. 8, 2011

(54) SLOTTED SET SCREW

(76) Inventor: Kuo-Chen Hung, No. 127, Alley 301, Lane 119, Guo Chang Road, Lu Jhu, Kaohsiung County (TW) 821

( * ) Notice: Subject to any disclaimer, the term of this patent is extended or adjusted under 35 U.S.C. 154(b) by 483 days.

(21) Appl. No.: 11/984,455

(22) Filed: Nov. 19, 2007

(65) Prior Publication Data

US 2009/0129888 A1 May 21, 2009

(51) Int. Cl.
*F16B 35/00* (2006.01)
(52) U.S. Cl. ...................................... 411/393; 411/405
(58) Field of Classification Search ................ 411/393, 411/403, 410, 405, 418, 419
See application file for complete search history.

(56) References Cited

U.S. PATENT DOCUMENTS

| | | | | |
|---|---|---|---|---|
| 1,061,844 A * | 5/1913 | Howerton | ................... | 292/350 |
| 2,337,412 A * | 12/1943 | Post | ........................... | 408/185 |
| 2,855,609 A * | 10/1958 | Moore | ........................... | 470/8 |
| 2,877,681 A * | 3/1959 | Brown | ........................ | 411/393 |
| 3,424,212 A * | 1/1969 | Kemper | ....................... | 81/436 |
| 3,470,786 A * | 10/1969 | Martins | ....................... | 411/405 |
| 5,358,368 A * | 10/1994 | Conlan et al. | ............... | 411/410 |
| 5,641,258 A * | 6/1997 | Sala | ............................. | 411/404 |
| 6,220,805 B1 * | 4/2001 | Chang | ......................... | 411/403 |
| 7,217,057 B2 * | 5/2007 | Keller | ..................... | 403/109.3 |

\* cited by examiner

*Primary Examiner*—Flemming Saether
(74) *Attorney, Agent, or Firm*—Alan Kamrath; Kamrath & Associates PA

(57) ABSTRACT

A slotted set screw includes a slot in an upper end surface and a cut metal waste storing recess respectively formed at two ends of the slot. The cut metal waste storing recess is defined by a vertical wall and a flat bottom wall to have a large opening, separated from the slot for a little distance. The opening of the cut metal waste storing recess communicates with the outside of the threads of the set screw. Thus, cut metal waste may be stored in the cut metal waste storing recesses during cutting threads of the set screw and cannot fall into and remain in the slot to result in extra cleaning work for the waste in the slot.

7 Claims, 4 Drawing Sheets

SLOTTED SET SCREW

BACKGROUND OF THE INVENTION

This invention relates to a slotted set screw and, particularly, to one provided with a cut metal waste storing recess respectively provided at two opposite ends of the slot of a set crew and with the two waste storing recesses being parallel to each other and having a large opening so that cut metal waste produced by cutting threads in an outer surface of the shank of the set screw may naturally fall into the two waste storing recesses without falling into and clogging the slot of the set screw during processing of the set screw.

DESCRIPTION OF THE PRIOR ART

A first conventional slotted set screw 10 shown in FIG. 1 is provided with a slot 11 in the center of the upper end surface for the flat tip of a screwdriver to fit with for driving the first conventional slotted set screw 10. In processing the first conventional slotted set screw 10, a half finished material of a set screw already formed with a slot is next cut with threads in an outer surface of its shank. However, in cutting threads, cut metal waste may fall into the slot of a set screw, resulting in extra work for cleaning the cut metal waste out of the slot, or the finished set screw may become disqualified to be discarded, in case the cut metal waste is not completely removed out of the slot.

A second conventional slotted set screw 20 disclosed in a Taiwan patent of No. 468520, includes a slot 21 in an upper end surface as shown in FIGS. 2 and 3. A tapered bottom surface 22 is respectively formed at two ends of the slot 21, and the sidewalls 23 of the slot 21 are made to incline outward. Thus, the width and the depth of the two ends of the slot 21 are larger than the intermediate portion of the slot 21. Therefore, in processing the second conventional slotted set screw 20, cut metal waste may fall out of and not remain in the slot 21, even if it falls into the slot 21.

Although the second conventional slotted set screw 20 has the bottom surface 22 and the two sidewalls 23 formed as tapered in order to guide cut metal waste to fall out of the slot 21, they are rather complicated to process, taking much time and work.

SUMMARY OF THE INVENTION

This invention has been devised to offer a slotted set screw, simplifying its manufacturing process to shorten time needed for manufacturing, with cut metal waste not falling into and remaining in the slot of a set screw.

The feature of the invention is a cut metal waste storing recess respectively formed at two ends of a slot of a set crew before cutting threads of a set screw. The cut metal waste storing recess is defined by a vertical wall and a flat bottom wall to have a large opening and separated from the slot for a little distance. Therefore, cut metal waste may not fall and remain in the slot during processing the threads. So extra cleaning work for the cut metal waste remaining in the slot is not necessary after the threads are finished, as needed in making conventional set screws.

BRIEF DESCRIPTION OF DRAWINGS

This invention may be better understood by referring to the accompanying drawings, wherein.

DETAILED DESCRIPTION OF PREFERRED EMBODIMENTS

Figure 1:
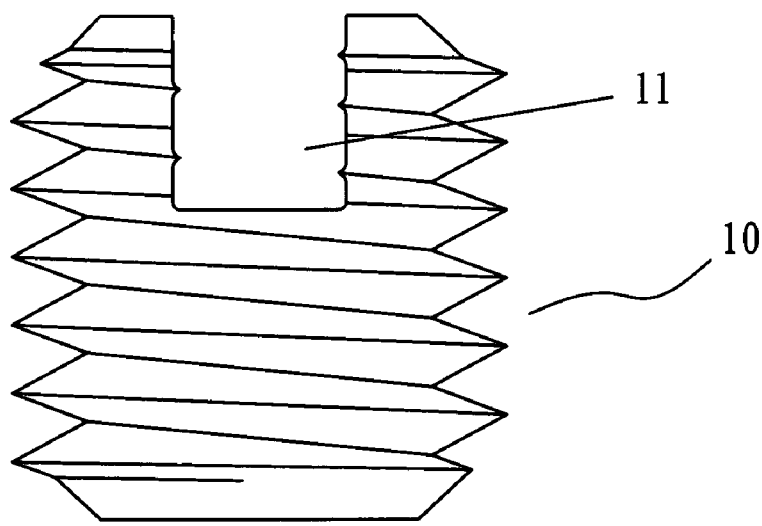
FIG. 1 is a front view of a first conventional slotted set screw.
Figure 2:
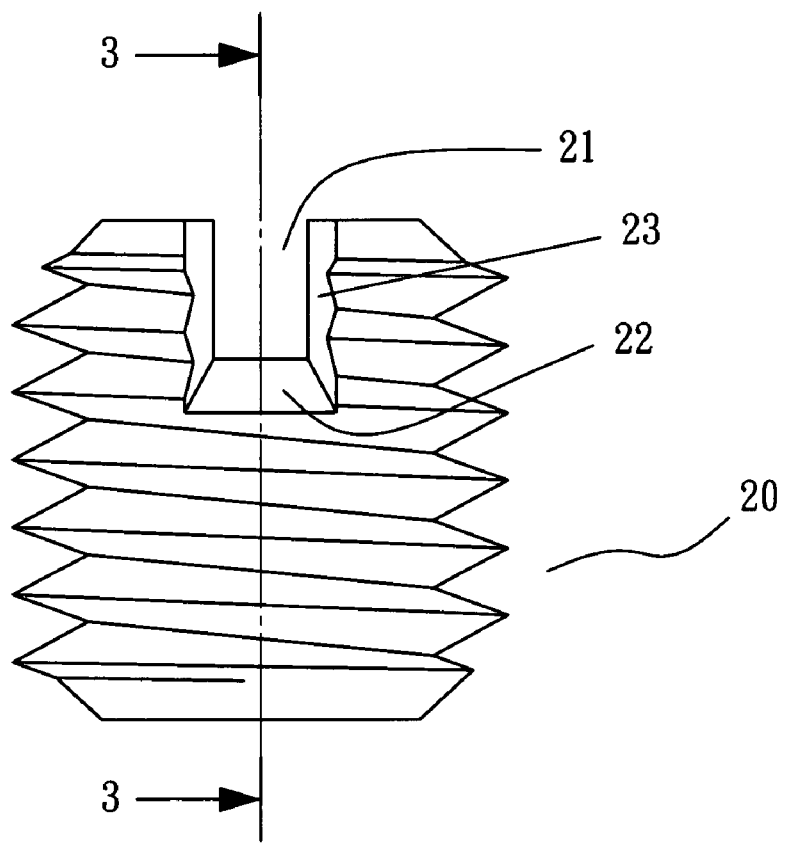
FIG. 2 is a front view of a second conventional slotted set screw.
Figure 3:
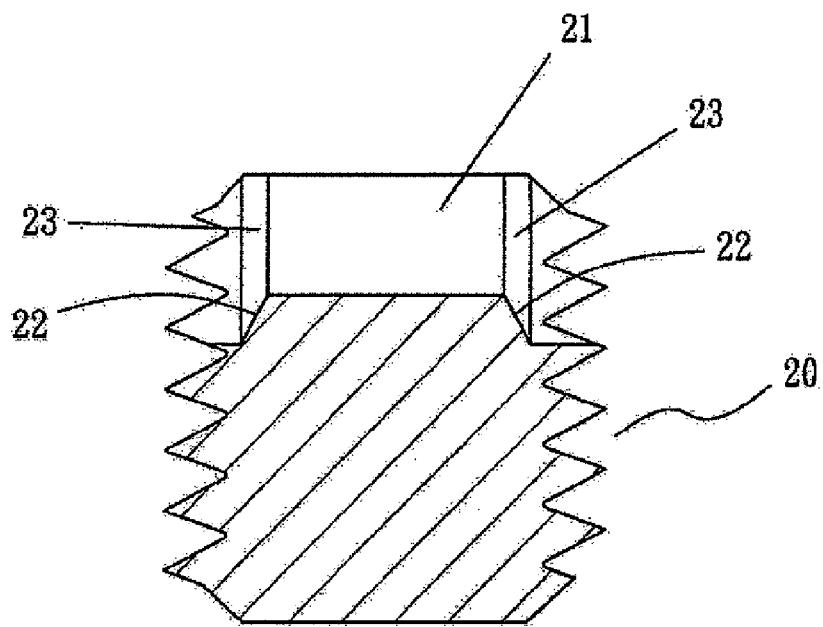
FIG. 3 is a cross-sectional view of the line 3-3 in FIG. 2.
Figure 4:
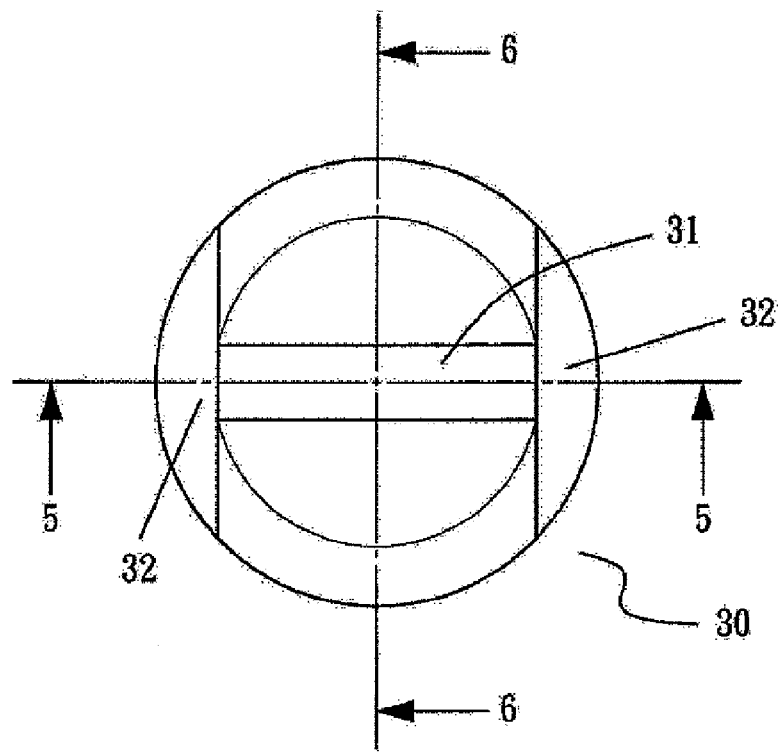
FIG. 4 is an upper view of a slotted set screw in the present invention.
Figure 5:
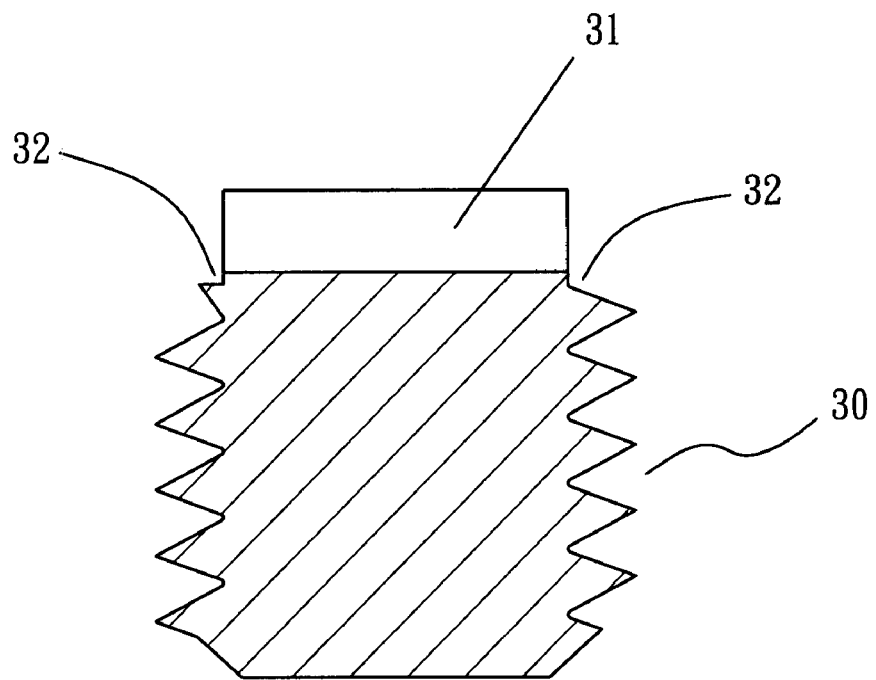
FIG. 5 is a cross-sectional view of the line 5-5 in FIG. 4.
Figure 6:
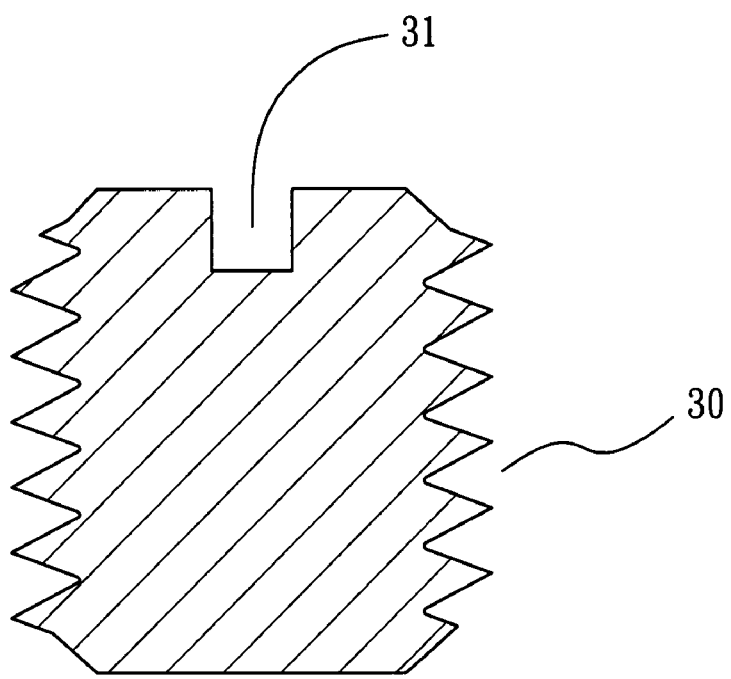
FIG. 6 is a cross-sectional view of the line 6-6 in FIG. 4.

A preferred embodiment of a slotted set screw 30 in the present invention, as shown in FIGS. 4, 5 and 6, includes a slot 31 formed in an upper end. A cut metal waste storing recess 32 is respectively formed just under an opening at two opposite ends of the slot 31 and just on the uppermost thread of the set screw 30. Thus, there is a little distance between the slot 31 and the cut metal waste storing recesses 32. Moreover, each waste storing recess 32 has two ends and a bottom extending out of the set screw. The opening of each recess 32 is larger than that of the slot 31. Each waste storing recess 32 is defined by a vertical wall and a tapered down flat bottom wall. Therefore, in cutting threads in an outer surface of the shank of the slotted set screw in the invention, cut metal waste may remain in the cut metal waste storing recesses 32 and will not fall into the slot 31 to harm the wholeness of the slot 31. So, it is quite clear that cut metal waste cannot fall into the slot 31 of a slotted set screw 30 in processing, so long as a cut metal waste recess 32 is formed respectively at two ends of the slot 31, with a little distance set between the recesses 32 and the slot 31, improving the draw back in manufacturing conventional slotted set screws.

Figure 7:
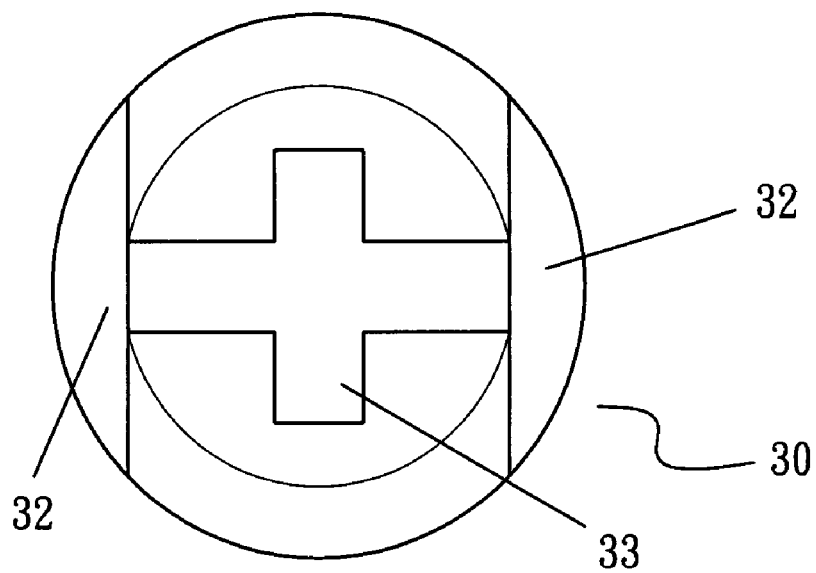
FIG. 7 is an upper view of a cross recessed set screw in the present invention.
Figure 8:
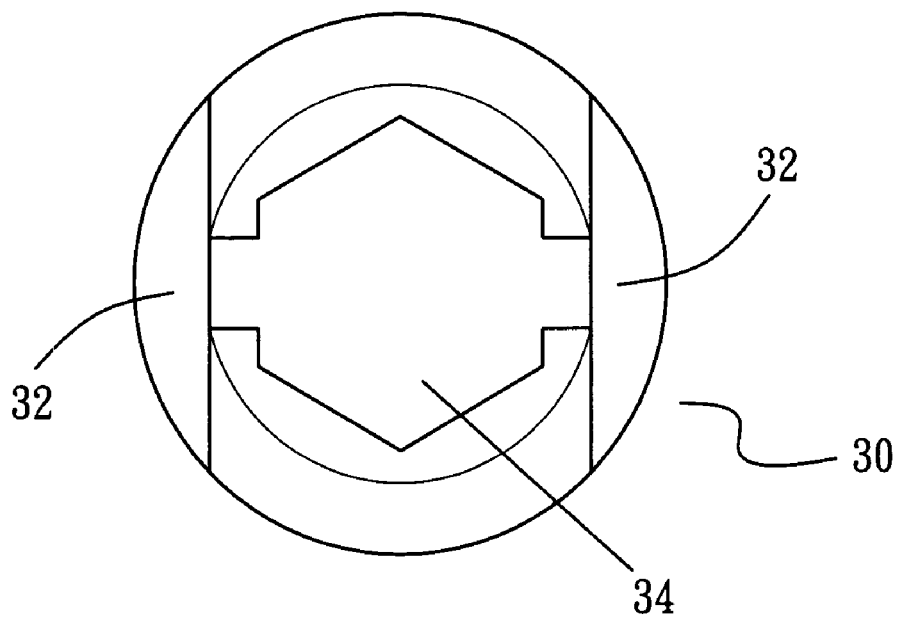
FIG. 8 is an upper view of a hexagon recessed set screw in the present invention.

Next, as shown in FIGS. 7 and 8, in order to enable use of a Phillips-head-tip screwdriver or a hexagonal wrench, the slotted set screw 30 can be made with a Phillips head recess 33 or a hexagonal recess 34 instead of the slot 31. Then, the set screw 30 with a Phillips head recess 33 can be driven by both the flat tip and the Phillips-head-tip screwdriver. Likewise, the set screw 30 with a hexagon recess 34 can be driven by both the flat tip screwdriver and a hexagon wrench.

In general, the cut metal waste storing recess 32 formed at two ends of the slot 31 can store cut metal waste during processing the threads, preventing cut metal waste from falling into the slot 31. The troublesome processes for forming the bottom and the sidewalls of the slot in the second conventional set screws is not needed, simplifying and speeding the manufacturing process.

While the preferred embodiments of the invention have been described above, it will be recognized and understood that various modifications may be made therein and the appended claims are intended to cover all such modifications that may fall into the spirit and scope of the invention.

What is claimed is:

1. A slotted set screw comprising:
   a shank including an upper end, a lower end and a cylindrical outer surface having an axis;
   threads formed on the cylindrical outer surface and extending between the upper end and the lower end;
   a slot for a screwdriver to fit therein for driving, with the slot extending from the upper end towards but spaced from the lower end, with the slot extending in a diametric direction from the axis, with the slot having first and second ends at circumferentially spaced locations on the outer surface; and a cut metal waste storing recess at the first end of said slot, said cut metal waste storing recess defined by a vertical wall intersecting with the slot generally perpendicular to the diametric direction and extending from the upper end towards but spaced from the lower end to the threads at circumferentially spaced locations on the outer surface, with the cut metal waste storing recess further defined by a flat bottom wall extending from the vertical wall to the threads and spaced from the upper end and the lower end.

2. The slotted set screw as claimed in claim 1, wherein said vertical wall of said cut metal waste storing recess has a lower end tangent to a root of said threads.

3. The slotted set screw as claimed in claim 1, wherein said slot comprises a Phillips head recess for both a flat-head-tip and a Phillips-head-tip screwdriver to fit with.

4. The slotted set screw as claimed in claim 1, wherein said slot comprises a hexagonal recess for both a flat-tip screwdriver and a hexagonal wrench to fit with.

5. The slotted set screw as claimed in claim 1, wherein said slot comprises a square recess.

6. The slotted set screw as claimed in claim 1 wherein the vertical wall extends from the upper end greater than the slot extends from the upper end.

7. The slotted set screw as claimed in claim 1 wherein the flat bottom wall extends generally perpendicular to the vertical wall.

* * * * *